Nov. 17, 1959   J. H. RUHL ET AL   2,913,254
VEHICLE AIR SUSPENSION SYSTEM

Filed Dec. 23, 1957   2 Sheets-Sheet 1

J.H. RUHL
E.J. MAZURKIEWICZ
INVENTORS

BY  E. C. McRae
    J. R. Faulkner
    D. H. Oster

ATTORNEYS

Nov. 17, 1959 J. H. RUHL ET AL 2,913,254
VEHICLE AIR SUSPENSION SYSTEM
Filed Dec. 23, 1957 2 Sheets-Sheet 2

J. H. RUHL
E. J. MAZURKIEWICZ
INVENTORS

BY

ATTORNEYS

United States Patent Office 2,913,254
Patented Nov. 17, 1959

2,913,254

VEHICLE AIR SUSPENSION SYSTEM

John H. Ruhl, Birmingham, and Edward J. Mazurkiewicz, Detroit, Mich., assignors to Ford Motor Company, Dearborn, Mich., a corporation of Delaware Application December 23, 1957, Serial No. 704,493

5 Claims. (Cl. 280—124)

This invention relates to an air suspension system used in automotive vehicles and the like. In particular, it relates to a novel closed air system employing a minimum of parts, requiring little or no service and maintenance, involving a small amount of assembly time, costing a relatively small amount of money to produce, and giving dependable safe service over a prolonged period of time.

In one embodiment of this invention, the air spring is connected to a cylinder having a piston movable therein. The air spring is then charged with compressed air of a predetermined volume and pressure. The piston is motor driven and is connected by appropriate wiring to an electric sensing switch which is responsive to variations in the motor vehicle height. The sensing switch may operate off the front swaybar for the actuation of the front air spring motor, and may operate off the differential housing to actuate the rear air spring motor. Movement of the piston will vary the air pressure in the air spring causing the air spring to be extended or contracted. In the event a pair of air springs are to be connected to one cylinder, it is possible to combine the pistons in an opposed relationship and drive them through lead screws connected to a single motor either simultaneously or independently of each other. Assistance may be provided to the motor in the form of pre-charging the area behind the pistons, therefore cutting down on the work load of the motor and making a smaller motor satisfactory. The cylinder is, of course, hermetically sealed and the pistons may take any form which will compress the air in the air spring without permitting leakage or blowby. The unit will have little or no wear during the life of the vehicle as there are no lubrication or water problems present.

With a closed system made in accordance with the applicants' invention, it is possible to provide a continuous adjusting system with a single charge of pressurized air and eliminate the need of a compressor, high-pressure reserve tank, solenoid valves, check valves, and, of courses, the continuous replenishment of air in the air spring. Being a closed system unit, dirt, moisture, rust and freeze-up problems are eliminated. The use of the precharged chamber on the motor side of the piston reduces the power requirements of the motor on both the raise and lower cycles. Production lean problems in the completed vehicle may be trimmed out by simply increasing the amount of air to the proper side of the unit. Little or no noise is present. By the use of an additional switch, it is possible to provide an override control which will maintain the position of the pistons regardless of the sensing switch requirement. This added feature is important when temporary conditions are encountered, such as bumper jack raising of the vehicle, bumper hang-up, etc.

Other objects and advantages will become more apparent as this description proceeds, particularly in connection with the accompanying drawings, in which.

Figure 1:
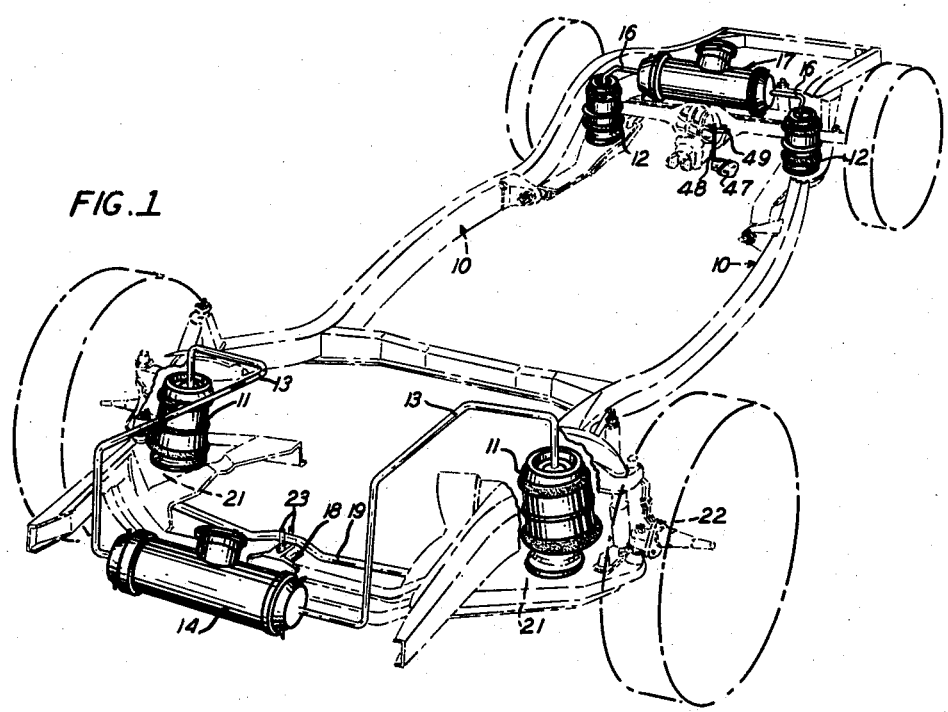
Figure 1 is a schematic perspective drawing of a system made in accordance with the applicants' invention and installed on a motor vehicle chassis.

Referring now to the drawings and particularly to Figure 1, the reference numeral 10 indicates generally the chassis of a motor vehicle having a pair of front air springs 11 and a pair of rear air springs 12 which are positioned between the sprung and unsprung portions of the chassis. The front air springs 11 are connected by conduits 13 to a hermetically sealed pressure chamber indicated generally at 14. The rear air springs 12 are likewise connected by conduits 16 to the rear pressure chamber 17. The pressure chambers 14 and 17 may be identical in construction and configuration. The arrangement shown in Figure 1, is that of a two point suspension control system in which the front control is accomplished through a sensing switch 18 secured to a portion of the chassis 10 and operable by the swaybar 19 which is mounted to the suspension arms 21 which in turn is pivotally connected to the spindle 22 in a conventional and known manner. The swaybar 19 is positioned directly between a pair of upright arms 23 on the sensing switch 18. Movement of the swaybar in a fore and aft direction will actuate the sensing switch in a manner to be described later.

Figure 2:
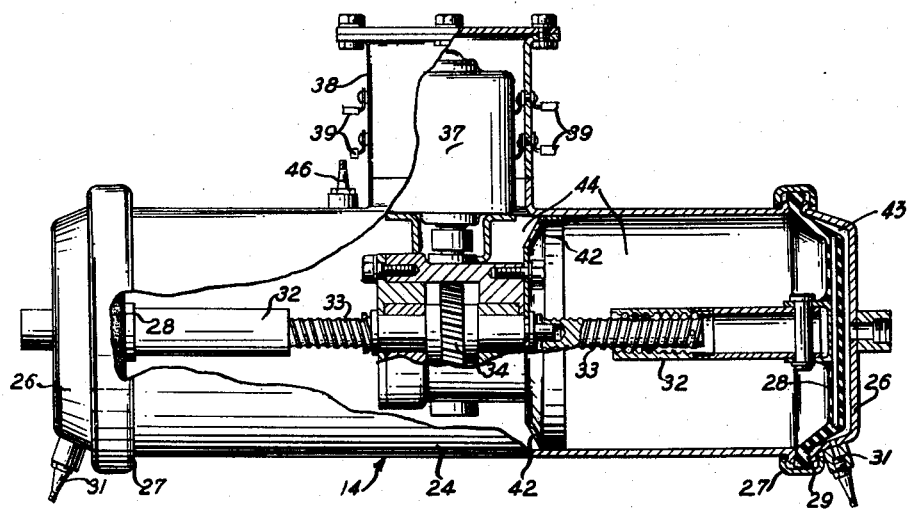
Figure 2 is an enlarged view partially in section of a cylinder having a pair of diaphragmed pistons extended to their full compression position.
Figure 3:
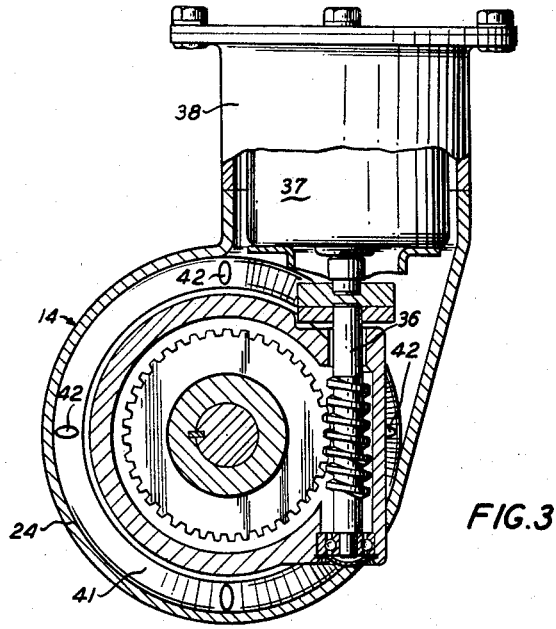
Figure 3 is a cross sectional view of the cylinder shown in Figure 2 and illustrating the motor means for moving the pistons; and, Figure 4 is an enlarged view partially in section of an alternate piston arrangement.

The pressure chamber 14 is a hermetically sealed unit having a main cylindrical body 24 and a pair of end caps 26 secured such as by clamps 27. A pair of rubber diaphragm pistons 28 are secured at their outer ends 29 between the caps 26 and the body 24 by the clamps 27. Caps 26 are provided with an air valve 31 which permits the charging of the air springs 11 or 12 to a predetermined air pressure. Each of the diaphragm pistons 28 is connected to an internally threaded sleeve 32 threadably connected to a lead screw 33 connected to an internal ring gear 34. The ring gear 34 is driven by a worm shaft 36 connected to a reversible electric motor 37 housed in extension 38 of the body 24. Leads 39 are connected to the sensing switch 18 (not shown) in a conventional manner and to conventional electrical connections to form an electrical circuit. The pistons 28 and their respective driving means are axially aligned in the cylindrical body 24 by means of a radial bracket 41 which is weldably secured to the inside of the body 24. A plurality of apertures 42 are located in the bracket 41 to permit the passage of air to both sides of the bracket. As can be seen in Figure 2, the diaphragm pistons 28 effectively separate the pressure chamber 14 into two outboard chambers of which only one is shown at 43 and connected to their respective air spring, and a central chamber 44 located on both sides of the bracket 41. Central chamber 44 is also provided with air valve 46 so that the central chamber 44 may be charged with pressurized air. Because of the central pressure chamber precharging, the effective work load on the motor may be substantially reduced thus permitting a smaller motor to be used.

Referring now to the rear suspension, the receptacle 17 contains the same parts but is in turn connected by electrical means (not shown) to an electric sensing switch 47 which is actuated through linkage arms 48 and 49 connected to the vehicles differential 51.

In actual operation, the chambers 43 and 44 are precharged with air as desired. The charging of the center chamber 44 is done to assist the movement of the diaphragm pistons 28 and thus impose a lower load requirement on the motor. It is thus possible to use a small motor to drive the pistons outboard to compress the air in the respective air spring and thus extend the air spring to vary the vehicle height. When it is necessary to lower the vehicle height, the motor is, of course, assisted by the air spring pressure.

It is, of course, possible to use a pressure cylinder for each wheel actuated by its own motor. The precharged chamber on the inboard side of the piston may be omitted if sufficient power means are used to move the diaphragm pistons. If, however, the power assist is used, the chamber would be of a two chamber construction.

Figure 4:
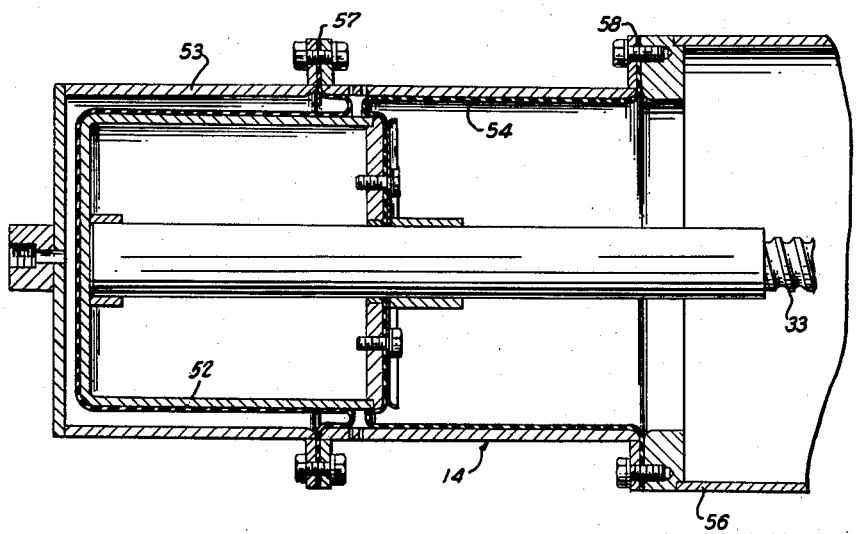

An alternate piston is shown in Figure 4 wherein the rolling diaphragm is used comprising a can-like piston 52 having fore and aft rolling diaphragms 53 and 54 connected to both the piston at the fore and aft portions and to spaced apart portions on cylindrical body 56 such as at 57 and 58. It is also possible to use a piston normally associated with combustion engines and having appropriate sealing means on the peripheral edge thereof, so that the passage of air from one chamber to the other is avoided. It can thus be seen that by once charging the air springs through the air valves 31, a closed air suspension system is provided which can vary the vehicle height simply by the compression of the air in the spring causing the spring to extend or contract in the vertical plane.

It will be understood that the invention is not to be limited to the exact construction shown and described, but that various changes and modifications may be made without departing from the spirit and scope of the invention, as defined in the appended claims.

What is claimed is:

1. A pressurized closed air suspension system for a motor vehicle comprising in combination an air spring, a pressure chamber having a predetermined charge of pressurized air connected to said air spring, power means in said pressure chamber including a piston and a motor adapted to move said piston in one of two directions, said predetermined charge of pressurized air being disposed on both sides of said piston, one of said directions increasing the air pressure in said air spring and the other of said directions decreasing the air in said air spring, and means responsive to height variations in the motor vehicle suspension for actuating said power means.

2. A fluid suspension system for a motor vehicle comprising a pair of precharged fluid springs, a pressure chamber, passage means connecting said fluid springs to the opposite ends respectively of the pressure chamber, a pair of opposed horizontally disposed independently movable pistons in said pressure chamber arranged to vary the air in the respective fluid pressure spring, a motor connected to said pistons, an additional charge of pressurized fluid in said pressure chamber behind said pistons, and means responsive to variations in the vehicle height to actuate said motor to move the pistons.

3. A precharged air suspension system for a motor vehicle, comprising an air spring extendable and contractable in the vertical direction in response to air pressure, a pressure receptacle, a piston slidably mounted within said pressure receptacle and defining a chamber on each side of the piston of a size determined by the position of said piston, conduit means between the air spring and one of the chambers in the pressure receptacle, a charge of pressurized air in said chamber connected to said air spring, power means located in the other mentioned chamber and connected to said piston, an additional charge of pressurized air in said chamber in which said power means are located, and means responsive to variations in the motor vehicle height to actuate said power means to move said piston and to vary the air pressure in the air spring and change the vertical height of said air spring.

4. A fluid suspension system for a motor vehicle, a pair of vertically extendable fluid springs, a pressure container, said container having a center chamber and a pair of outer chambers, said chambers being separated by a pair of flexible members, passage means connecting each outer chamber with one of the fluid springs, pressure charged fluid in each of said chambers, power actuated means in said center chamber operable upon said flexible members to move them to vary the fluid pressure in the fluid springs, and means responsive to variations in the motor vehicle height to actuate said power means.

5. A fluid suspension system for a motor vehicle comprising in combination a pair of vertically extendable fluid springs, a pressure container, said container having a center chamber and a pair of outer chambers, said chambers being separated by a pair of independently movable piston members, fluid passage means connecting each outer chamber with one of the fluid springs, a predetermined charge of pressurized fluid in each of said outer chambers, an additional charge of predetermined pressurized fluid in said center chamber, said additional predetermined charge of fluid having a pressure less than the pressure of said fluid in each of the outer chambers, power actuated means in said center chamber operable upon said piston members to move them to vary the fluid pressure in the fluid springs, and means responsive to variations in the motor vehicle height to actuate said power means.

References Cited in the file of this patent

UNITED STATES PATENTS

| | | |
|---|---|---|
| 2,191,211 | Krotz | Feb. 20, 1940 |
| 2,703,718 | Hutchinson | Mar. 8, 1955 |

FOREIGN PATENTS

| | | |
|---|---|---|
| 823,754 | France | Oct. 25, 1937 |